Sept. 16, 1952 T. A. PERLS ET AL 2,611,021
RESONANT BRIDGE CIRCUITS
Filed Aug. 17, 1949
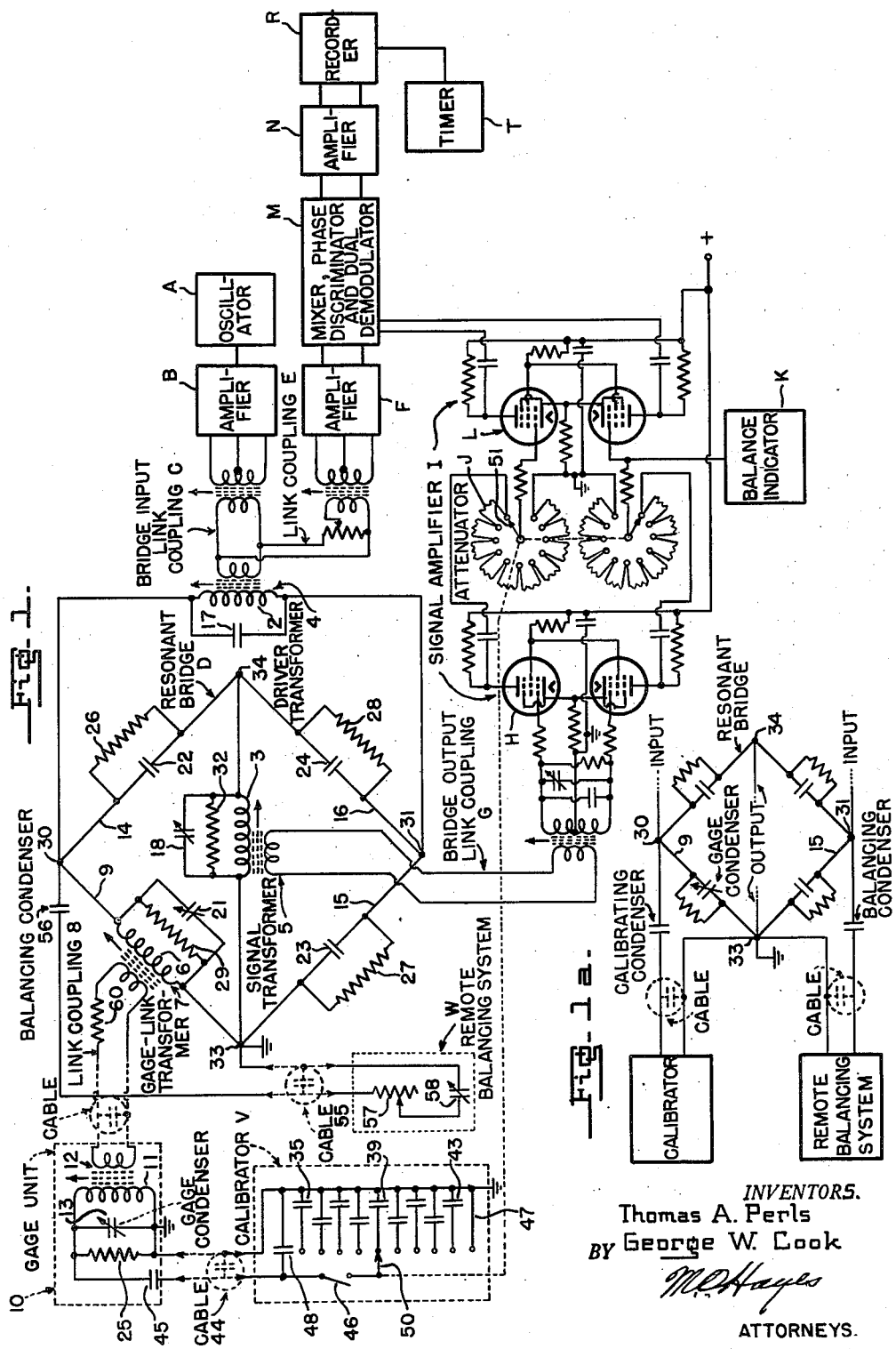
INVENTORS.
Thomas A. Perls
BY George W. Cook
M.C. Hayes
ATTORNEYS.

Patented Sept. 16, 1952

2,611,021

UNITED STATES PATENT OFFICE 2,611,021

RESONANT BRIDGE CIRCUITS

Thomas Alfred Perls, Glen Echo Heights, Md., and George W. Cook, Arlington, Va.

Application August 17, 1949, Serial No. 110,859

9 Claims. (Cl. 177—351)

(Granted under the act of March 3, 1883, as amended April 30, 1928; 370 O. G. 757)

The invention relates to improvements in oscillating circuits and more particularly to impedance bridge measuring systems and associated electrical equipment.

In the past, many measuring systems utilizing condensers as sensitive elements have been devised for use in the measurement or control of pressure, displacement, velocity, acceleration, torque, temperature and other physical quantities. These previously-used condenser-type measuring systems are characterized by one of the following circuit arrangements:

(1) The distributed capacity of the cable extending from the condenser gage to the measuring circuit is connected in parallel with the gage capacity.

(2) The sensitive condenser element is "link-coupled" to an oscillating circuit and an indication is obtained by detecting either an amplitude or a frequency modulation in the oscillating circuit.

(3) The sensitive condenser forms part of a rigidly assembled capacity bridge located with the condenser in the observation zone.

These prior systems suffer from certain disadvantages which have made some designers hesitant to use condenser-type measurement or control devices. Some of these disadvantages in the three above-mentioned circuits are:

(1) When the cable capacity is connected in parallel with the gage capacity, the sensitivity of the system is reduced and a change in the cable capacity introduces a relatively large spurious signal.

(2) The frequency-modulation system is inherently unstable since the frequency of the oscillator must be changeable and is therefore relatively easily changed by spurious effects. This is particularly true if the system is required to have zero-frequency response. Also a considerable sensitivity drift is to be expected.

(3) The bridge-at-the-gage arrangement increases the mass and bulk of the gage unit and requires four cables if it is desired to balance and calibrate the sensitive capacity element remotely. If used in a frequency modulation system, the bridge-at-the-gage arrangement also suffers from the previously-mentioned instability thereof.

An important object of the present invention is to provide an improved impedance bridge energized by a source of oscillating electric power through an input circuit tuned to resonate with the bridge at the frequency of the electric oscillations.

Another object of the invention is to provide an improved impedance bridge having one arm "link-coupled" to a remote gage circuit that is tuned to or near resonance at the resonant frequency of the bridge.

A further object of the invention is the provision of an improved impedance bridge having an output circuit tuned to resonate with the bridge at the frequency of the electric oscillations energizing the bridge.

Another important object is to provide an improved link-coupled resonant impedance bridge system wherein the resistance across the input terminals of the bridge is maintained high in order to develop high input voltage and at the same time to obtain a low resistance across the output terminals of the bridge in order to obtain the desired range of signal frequencies through the output link.

Another object is the provision of means at least partially compensating for non-linearity of a condenser gage.

Yet another object of the invention is to provide an electronic measuring system which may be used with any suitable sensitive element in which a change in electrical impedance, viz., resistance, inductance, capacitance, or a combination of these, is produced by a change in a force or condition to be measured or controlled.

The invention is also aimed toward the provision of a condenser gage having a reliable calibration system by which minute changes in capacity may be remotely introduced in parallel with the sensitive condenser.

The invention is further aimed toward providing a resonant impedance bridge system having a signal coupling link by which the frequency response may be easily controlled.

A still further object is the provision of a capacity bridge system including a capacity gage unit which is sensitive and stable in operation.

Other objects and many of the attendant advantages of this invention will be readily appreciated as the same becomes better understood by reference to the following detailed description when considered in connection with the accompanying drawings wherein:

Fig. 1 is a diagrammatic view of a preferred form of electronic measuring system.

Fig. 1a is a diagrammatic view of a modified portion of the electronic measuring system.

In the drawing similar reference characters designate corresponding parts throughout the views. The electronic measuring system, in the example shown in Fig. 1, comprises a condenser-type gage 13 and associated electronic circuit.

Minute capacity changes in the condenser-type gage are detected and recorded by means of a specially designed electronic circuit known as a resonant-bridge carrier system. The electronic circuit operates on the broad principle of the carrier-type strain indicator disclosed in the patent application of George W. Cook, Serial No. 718,731 filed December 27, 1946, now Patent No. 2,547,926. With the new link-coupled circuit arrangement, it is possible to locate a resonant bridge near the carrier system and have the gage unit alone at the end of a single low-capacity cable. Referring to Fig. 1, a sinusoidal oscillator A for example of a frequency of 500 kilocycles drives a buffer amplifier B having its output connected by a link coupling C to a resonant capacity bridge D. The voltage output of the buffer amplifier B is also connected by a link coupling E to an amplifier F. The bridge output voltage is reflected by a link coupling G into the first stage H of a signal amplifier I provided with an attenuator J and a balance indicator K. The signal voltage from the attenuator J drives the second stage L of the amplifier I which feeds into a mixer, phase discriminator and demodulator assembly M. The amplifier F also feeds a voltage into the mixer assembly M. Push-pull output voltages from the mixer assembly M drive an amplifier N which in turn energizes a recorder R, preferably of the cathode-ray oscilloscope type, and equipped with a timer T.

The resonant capacity bridge system D includes input and output link coupling inductances 2, 3 forming parts of the driver and signal transformers 4, 5, respectively, and a gage-link coupling inductance 6 forming part of a gage-link transformer 7 which serves to couple the gage link 8 to one arm 9 of the bridge. The gage unit 10 includes an inductance 11 forming part of a second gage-link transformer 12 at the opposite end of the gage link cable 8. Connected in parallel with the inductance 11 is a gage condenser 13 of a capacity which varies with the force or condition being measured. If the gage cable 8 were effectively in parallel with the gage condenser 13, the relative capacity change and hence the sensitivity of the system would be considerably reduced and a spurious signal would be obtained upon the occurrence of a change in either the capacity or resistance of the cable. It is therefore desirable to electrically isolate the cable from the sensitive portion of the circuit and have low-impedance terminations. This is conveniently achieved by the link-coupling 8 employing transformers 7, 12, between the condenser 13 and the associated measuring circuit. The gage cable 8 may be of great length provided its length is of the order of N half-wavelengths at the carrier frequency, where N is an integer and includes zero. The length of the gage cable 8 is not critical, but since the cable operates in a similar fashion to a transmission line, lengths far removed from zero or multiples of half-wavelengths produce impedance inversions which adversely affect the operation of the bridge. The four arms 9, 14, 15, 16, of the bridge tune to resonance on the one hand with the input inductance 2 and on the other with the output inductance 3 at the carrier frequency of 500 kc. In order to prevent detuning, the input circuit is provided with a condenser 17 connected in parallel with the input inductance 2. The output circuit is provided with a preferably externally adjustable trimmer condenser 18 connected in parallel with the output inductance 3. The parallel combination of gage condenser 13 and inductance 11 forms a resonant circuit tuned to oscillate near the carrier frequency. Associated with the bridge arm 9 is a remote calibrator V and a remote balancing system W which will be hereinafter described in detail.

In order to tune the input and output inductances 2, 3, to the carrier frequency, it is desirable to make all four arms 9, 14, 15, 16, of the bridge capacitive, as by providing condensers 21—24 therein. A phase angle slightly different from —90 degrees is permissible however without any serious loss in sensitivity, and parallel resistors 25—29 are therefore introduced in all arms of the bridge and in the gage unit in order to make negligible any random changes in the leakage resistance of the condensers used.

One of the effects of the gage link 8 is to introduce a dissipative component into the bridge arm 9 which contains the gage-link transformer 7. In order to balance the bridge D, it is therefore convenient to make the parallel resistance 26 in bridge arm 14 correspondingly low. If the bridge D is embedded, for instance in a thermosetting resin (not shown) to reduce spurious signals due to relative vibrational motion of its components, final approximate resistive balancing may be accomplished by adjusting the value of an external resistor 29 in parallel with the gage arm. Instead of providing the low resistance 26 in bridge arm 14, a similarly low resistor could be used in arm 15. It is, however, desirable to maintain a high Q for the driver transformer 4, and only the chosen position of the compensating resistor 26 makes it possible to keep the resistance across the bridge input terminals 30, 31, at a value high compared with the inductive reactance of the input inductance 2 at the carrier frequency. On the other hand, in order to obtain the desired range of signal frequencies at critical coupling, the Q of the output inductance 3 is further lowered by the addition of a parallel resistor 32. The capacity in the bridge arms should be as low as possible in order to have a high sensitivity to minute changes in the reflected gage capacity, but on the other hand it should be high enough so that the impedance of the bridge arms may remain low with respect to the effective impedance across the bridge output terminals 33—34, thus obtaining high signal output.

As previously stated, the length of the link coupling cables is not critical, and a wide range of lengths may be employed. For example, where a 500 kc. carrier frequency is employed, a half-wavelength in the cable is approximately 850 feet, so that lengths of from zero to about 100 feet, from 750 to 950 feet, 1600 feet to 1800 feet, and so on, may be employed without seriously detracting from the operation of the bridge. Obviously, changes in carrier frequency will vary the appropriate cable lengths in inverse proportion to the changes.

It is desirable to have a calibration preceding each measurement, since the sensitivity of the circuit cannot be expected to remain constant under varying conditions of supply voltage and temperature because variations in the filament voltages of amplifier tubes and in the accelerating potential of the cathode-ray tube, for example, have considerable effect on the final deflection sensitivity, in inches per micromicrofarad. The sensitivity of the gage 13 may be easily determined with the help of a suitable sensitive capacity meter. Providing a stable gage element 13 is used, a calibration independent of circuit sensitivity changes can be provided by a known capacity change at the gage. This may be introduced into the resonant-bridge carrier system by switching any one 39 of a set of shunting condensers 35—43 across the calibration cable 44 leading from the gage condenser 13. This calibration cable 44 is itself in series with a condenser 45 in the gage unit, the entire system being in parallel with the gage condenser as shown in Fig. 1. The arrangement is such that the capacity in parallel with the gage condenser 13 is increased when the calibrating switch 46 is closed and the maximum capacity change is obtained when the capacity of the shunting condenser 47 is infinite, i. e., a "short." In order to make negligible any changes in the capacity of the cable, its capacity is increased by the addition of a parallel condenser 48 so that the combined capacity is as large as possible consistent with the value necessary to give a full-scale deflection at the lowest sensitivity of the recording equipment, using the infinite capacity shunting condenser 47. A ten-step attenuator J is incorporated in the output circuit of the resonant bridge and the selector 50 for the various shunting condensers 35—43 is ganged with the selector 51 for the ten different attenuator steps. The values of the shunting condensers 35—43 are selected for each setting of the attenuator so that the resulting capacity step will produce an output signal of approximately the same magnitude in all cases.

The cable 44 may be of great length provided it is made of a length which is an integral multiple of ½ wave length at the carrier frequency.

In many cases the measuring equipment may be located in an inaccessible position so that remote balancing of the bridge is desirable just before a record is taken. As in all bridges operated with an alternating source of voltage, a true balance must obtain for both reactance and resistance; hence the remote balancing system W must provide for changing both resistance and capacitance in one of the arms of the bridge. A length of low-capacity cable 55 is used in series with a balancing condenser 56 in the gage link arm 9 of the bridge. A variable resistor 57 and a continuously variable condenser system 58 in series therewith constitute the balancing elements. The resistive balancing range depends on the capacity setting and increases as the capacity in the balancing system is increased. The series resistance 57 has the effect of decreasing the effective capacitive balancing range, so that a relatively low resistance value is used for the initial setting.

The bridge elements themselves are part of a parallel resonant circuit, and the currents which circulate in the bridge are therefore high, the voltage appearing across the several arms being greatly in excess of the voltage impressed on the bridge because of the oscillatory action of the circuit. The voltage appearing across the input terminals of the bridge is made substantially independent of the variations in the capacitance of the gage because these variations are made proportionally small by the addition of the parallel capacitance 17 having a capacitance many times as large as the capacitance changes of the bridge. The band pass of the input link coupling is therefore sufficiently wide to tolerate the small changes in capacitance produced by the operation of the gage condenser 13.

Because of the large circulating currents in the several arms of the bridge, small changes in the leakage resistance of the capacitances 21, 22, 23 and 24 produce relatively large changes in the output voltage of the bridge. To reduce the effective changes in resistance, the shunt resistances 26, 27, 28 and 29 are added in parallel with the respective capacitances, the resistances thereof being low with respect to that of the leakage paths of the capacitances although being still high resistances which do not dissipate appreciable energy from the bridge.

This particular bridge differs in operation from other A.-C. bridges in that for a given bridge voltage, arm impedance, and output impedance it is not sufficient to merely zero the indicator in order to obtain satisfactory operation. It is possible to find an infinity of operating points at which the bridge-and-gage system is in balance, since any impedance change at the gage can be compensated by a suitable change in the gage-link arm 9 of the bridge. The circuit parameters which are most easily adjusted to change the operating point are the inductance of the gage coil 11 and the series resistance 60 in the gage link 8. The circuit characteristics which depend upon such changes are: bridge sensitivity, response at high frequencies, balancing range and overall linearity.

The sensitivity of the bridge increases as the gage-coil circuit is tuned toward resonance and the link series resistance 60 is decreased. The response to high-frequency capacity changes is however materially improved by increasing the link series resistance 60 to increase the width of the band of frequencies passed to the bridge circuit and is better off resonance than when the gage coil is very nearly tuned to the carrier frequency. The balancing range represents the capacity change at the gage 13 which can be compensated by adjustments in the remote balancing system W. When the link series resistance 60 is increased, the effective coupling coefficient in the gage link 8 is decreased and the balancing range is increased. A larger capacity change can be accommodated if it takes place entirely on one side of the resonance peak.

The sensitivity of the gage condenser 13 increases slightly as its capacity increases. It is therefore advantageous to choose an operating point at which the circuit sensitivity decreases with increase in gage capacity. Exact compensation can be obtained only if the respective rates of increase and decrease with change in capacity are equal. This condition is never realized in practice over a wide range, but partial compensation is easily obtained by operating the gage on the low-frequency side of resonance, so that the gage circuit composed of the gage condenser 13 and the gage transformer 12 approach resonance when the gage condenser 13 decreased capacity.

Instead of link coupling the gage circuit to the bridge arm 9 as shown in Fig. 1, the gage condenser 13 may be directly inserted in the arm 9 as shown in Fig. 1a, in which case the calibrator V is preferably connected across the terminals 30, 33 of the arm 9 and the balancing system W is connected across the terminals 31, 33 of the adjacent arm 15.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

We claim:

1. In a measuring system, a source of electric power of a high frequency, an impedance bridge having input and output terminals and paralleled impedance-capacitance elements in each arm thereof, an input inductance connected between the input terminals and coupled to said electric power source, a capacitance connected in parallel with said input inductance, said input inductance, said capacitance, and said bridge being tuned to resonate at the frequency of said source, an output inductance connected between the output terminals, said output inductance and said bridge being tuned to resonate at the frequency of said source, an indicator coupled to said output inductance, and means varying the impedance of one arm of the bridge responsive to a change in a force or condition to be measured.

2. In a measuring system, a source of electric power of a high frequency, an impedance bridge having input and output terminals, an input inductance connected between the input terminals and coupled to said electric power source, a capacitance connected between said input terminals, said input inductance, said capacitance, and said bridge being tuned to resonate at the frequency of said source, an output inductance connected between the output terminals, said output terminals and said bridge being tuned to resonate at the frequency of said source, an indicator coupled to said output inductance, said bridge having an impedance arm including an inductance and paralleled impedance-capacitance elements in the remaining arms thereof, a gage impedance adapted to vary responsive to a change in a force or condition to be measured, and a gage link having a length approximately equal to N half-wavelengths at the frequency of said source of electric power where N is an integer and includes zero, said link being inductively coupled to said bridge arm inductance and to said gage impedance.

3. In a measuring system, a source of electric power of a high frequency, an impedance bridge having input and output terminals, an input inductance connected between the input terminals, a capacitance connected between said input terminals, said input inductance, said capacitance, and said bridge being tuned to resonate at the frequency of said source, a bridge input link inductively coupled to said input inductance and to said source, an output inductance connected between the output terminals, said output inductance and said bridge being tuned to resonate at the frequency of said source, an indicator, a bridge output link inductively coupled to said output inductance and to said indicator, said bridge having an impedance arm including an inductance and paralleled impedance-capacitance elements in the remaining arms thereof, a gage impedance adapted to vary responsive to a change in a force or condition to be measured, and a gage link having a length approximately equal to N half-wavelengths at the frequency of said source of electric power where N is an integer and includes zero, said gage link being inductively coupled to said bridge arm inductance and to said gage impedance.

4. In a measuring system, a gage condenser having a capacity variable in response to changes in a force or condition to be measured, means connected to the gage condenser for indicating variations in its capacity, said means including an impedance bridge having impedance-capacitance elements in the arms thereof, a cable extending from the vicinity of said gage condenser to a remote zone, a calibrating condenser, the capacitances of said cable and said calibrating condenser being connected in series across said gage condenser, an auxiliary condenser, and means in said remote zone switching said auxiliary condenser into parallel relation to said cable capacitance.

5. In a measuring system, a source of carrier frequency electric power, a gage condenser having a capacity variable in response to changes in a force or condition to be measured, said condenser being in a circuit energized by said carrier frequency power, means for indicating variations in the capacity of said condenser, said means including an impedance bridge having impedance-capacitance elements in the arms thereof, a cable extending from the vicinity of said gage condenser to a remote zone, a calibrating condenser, the capacitances of said cable and said calibrating condenser being connected in series across said gage condenser, an auxiliary condenser, and means in said remote zone switching said auxiliary condenser into parallel relation to said cable capacitance, the effective length of said cable being an integral multiple of a half wave length at said carrier frequency.

6. In a measuring system, a source of electric power of a high frequency, a resonant circuit normally tuned to said frequency, said circuit including a plurality of bridge arms having an inductance, and paralleled impedance-capacitance elements therein, indicator means responsive to variations in tuning of said resonant circuit, a gage including a capacitance and an inductance connected in parallel and normally tuned to near resonance at said high frequency, said capacitance being variable in response to changes in a force or condition to be measured, a link having a length approximately equal to N half-wavelengths at the frequency of said source of electric power where N is an integer and includes zero, said gage link being inductively coupling said inductances so as to reflect changes in tuning of said gage into said resonant circuit, condensers in series connected across said gage capacitance, a set of calibrating condensers of graduated capacities, and means selectively connecting any one of said calibrating condensers across one of said series condensers to introduce a known capacity change in the gage.

7. In a measuring system, a source of electric power of a high frequency, a resonant circuit normally tuned to said frequency, said circuit including a plurality of bridge arms having an inductance and paralleled impedance-capacitance elements therein, an indicator responsive to variations in tuning of said resonant circuit, a gage including a capacitance and an inductance connected in parallel and normally tuned to near resonance at said frequency, said capacitance being variable in response to changes in a force or condition to be measured, a link inductively coupling said inductances so as to reflect changes in tuning of said gage into said resonant circuit, a set of calibration condensers of graduated capacities remote from said gage, condensers in series across said gage capacitance, one of said condensers being formed by a cable, and means including said cable selectively connecting any one of said calibrating condensers across one of said series condensers to introduce a known capacity change in the gage.

8. In an alternating current bridge, a cable connected at one end portion to one arm of the bridge so as to provide a cable capacitance across said arm, and a balancing system comprising a variable resistance in series with a variable reactance said system being connected to the cable remote from said bridge and in parallel with the cable capacitance.

9. In a measuring system, a source of electric power of a high frequency, a capacity bridge having input and output terminals, an input inductance connected between the input terminals and coupled to said electric power source, said input inductance and said bridge being tuned to resonate at the frequency of said source, an output inductance connected between the output terminals, said output terminals and said bridge being tuned to resonate at the frequency of said source, an indicator coupled to said output inductance, said bridge having capacitance arms and an impedance arm including an inductance, a gage capacitance adapted to vary responsive to a change in a force or condition to be measured, a gage link having a length approximately equal to N half-wavelengths at the frequency of said source of electric power where N is an integer and includes zero, said gage link being inductively coupled to said bridge arm inductance and to said gage capacitance to reflect capacity changes in said gage capacitance into said impedance arm, and resistors in parallel with each of said capacitance arms and said gage capacitance to make negligible the effects of random changes in the leakage resistance in said capacitances.

THOMAS ALFRED PERLS.
GEORGE W. COOK.

REFERENCES CITED

The following references are of record in the file of this patent:

UNITED STATES PATENTS

| Number | Name | Date |
| --- | --- | --- |
| 1,757,659 | Edenburg | May 6, 1930 |
| 1,939,067 | Legg | Dec. 12, 1933 |
| 2,097,226 | Miyazaki | Oct. 26, 1937 |
| 2,116,080 | Parker | May 3, 1938 |
| 2,178,471 | De Bruin | Oct. 31, 1939 |
| 2,371,395 | Keeling | Mar. 13, 1945 |
| 2,407,141 | Cooke | Sept. 3, 1946 |
| 2,457,727 | Rifenberg | Dec. 28, 1948 |
| 2,490,238 | Simons | Dec. 6, 1949 |

OTHER REFERENCES

Alternating Current Bridge Methods, Hague, 4th ed., Pitman Pub. Corp., 1938, pages 253–5.